(12) United States Patent
Albrecht et al.

(10) Patent No.: US 8,475,669 B2
(45) Date of Patent: Jul. 2, 2013

(54) SYSTEM, METHOD AND APPARATUS FOR MASTER PATTERN GENERATION, INCLUDING SERVO PATTERNS, FOR ULTRA-HIGH DENSITY DISCRETE TRACK MEDIA USING E-BEAM AND SELF-ASSEMBLY OF BLOCK COPOLYMER MICRODOMAINS

(75) Inventors: Thomas Robert Albrecht, San Jose, CA (US); Bruno Marchon, Palo Alto, CA (US); Ricardo Ruiz, San Bruno, CA (US)

(73) Assignee: HGST Netherlands B.V., Amsterdam (NL)

( * ) Notice: Subject to any disclaimer, the term of this patent is extended or adjusted under 35 U.S.C. 154(b) by 524 days.

(21) Appl. No.: 12/345,799

(22) Filed: Dec. 30, 2008

(65) Prior Publication Data
US 2010/0165512 A1 Jul. 1, 2010

(51) Int. Cl.
*B44C 1/22* (2006.01)

(52) U.S. Cl.
USPC ............. 216/22; 216/41; 428/64.2; 428/800; 360/313

(58) Field of Classification Search
USPC ............. 216/22, 41; 428/64.2, 800; 360/313
See application file for complete search history.

(56) References Cited

U.S. PATENT DOCUMENTS

| 6,661,592 B2 * | 12/2003 | Richter et al. .................. 360/48 |
| 7,009,791 B2 | 3/2006 | Shimatani |
| 7,115,208 B2 | 10/2006 | Hieda et al. |
| 7,158,340 B2 | 1/2007 | Tagami et al. |
| 7,220,452 B2 | 5/2007 | Hammond Cunningham et al. |
| 7,323,258 B2 | 1/2008 | Kamata et al. |
| 7,521,094 B1 * | 4/2009 | Cheng et al. ................... 427/532 |
| 8,039,196 B2 * | 10/2011 | Kim et al. .................. 430/270.1 |
| 2004/0077156 A1 | 4/2004 | Tsakalakos et al. |
| 2005/0094298 A1 | 5/2005 | Sakurai et al. |
| 2005/0266271 A1 | 12/2005 | Tsuchiya et al. |
| 2006/0222897 A1 | 10/2006 | Kamata et al. |

(Continued)

FOREIGN PATENT DOCUMENTS

| CN | 1841514 A | 10/2006 |
| JP | 200310933 | 4/2003 |
| JP | 2004303302 | 10/2004 |
| JP | 2007272962 | 10/2007 |

OTHER PUBLICATIONS

Kim et al. Macromolecules, vol. 39, (2006), pp. 5466-5470.*

(Continued)

*Primary Examiner* — Nadine G Norton
*Assistant Examiner* — Maki Angadi

(57) ABSTRACT

A system, method, and apparatus for forming a high quality master pattern for patterned media, including features to support servo patterns, is disclosed. Block copolymer self-assembly is used to facilitate the formation of a track pattern with narrower tracks. E-beam lithography forms a chemical contrast pattern of concentric rings, where the spacing of the rings is equal to an integral multiple of the target track pitch. The rings include regions within each servo sector header where the rings are offset radially by a fraction of a track pitch. Self-assembly is performed to form a new ring pattern at the target track pitch on top of the chemical contrast pattern, including the radial offsets in the servo sector headers. When this pattern is transferred to disks via nanoimprinting and etching, it creates tracks separated by nonmagnetic grooves, with the grooves and tracks including the radial offset regions.

19 Claims, 3 Drawing Sheets

U.S. PATENT DOCUMENTS

| | | | |
|---|---|---|---|
| 2006/0222898 | A1 | 10/2006 | Ichihara |
| 2006/0286345 | A1 | 12/2006 | Nakao |
| 2007/0172704 | A1 | 7/2007 | Lee et al. |
| 2007/0211592 | A1 | 9/2007 | Sakurai et al. |
| 2007/0217075 | A1 | 9/2007 | Kamata et al. |
| 2007/0230055 | A1 | 10/2007 | Shirotori et al. |
| 2008/0002295 | A1 | 1/2008 | Sakurai et al. |
| 2008/0192606 | A1* | 8/2008 | Kimura et al. ............ 369/94 |
| 2009/0042112 | A1* | 2/2009 | Sugimura et al. ............ 430/5 |

OTHER PUBLICATIONS

Maito, Katsuyuki, et al., 2.5-Inch Disk Patterned Media Prepared by an Artificially Assisted Self-Assembling Method, IEEE Transactions on Magnetics, vol. 38, No. 5, Sep. 2002.

Kikitsu, Akira, et al., Recent Progress of Patterned Media, IEEE Transactions on Magnetics, vol. 43, No. 9, Setp 2007.

* cited by examiner

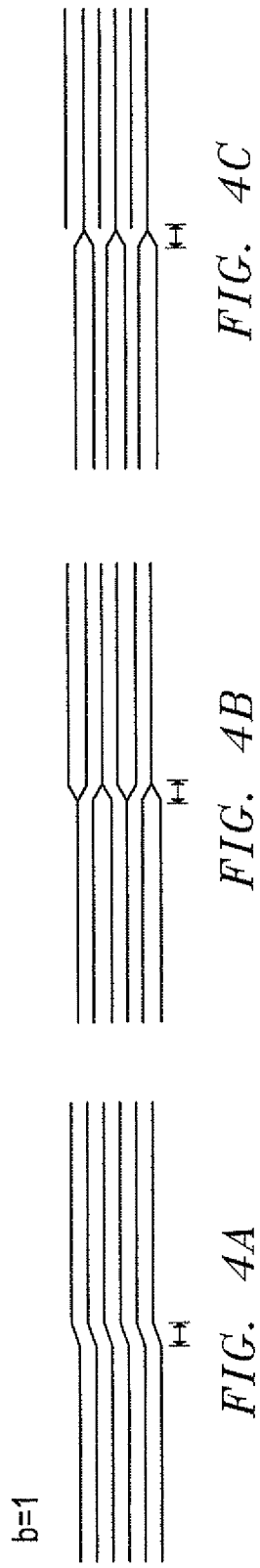
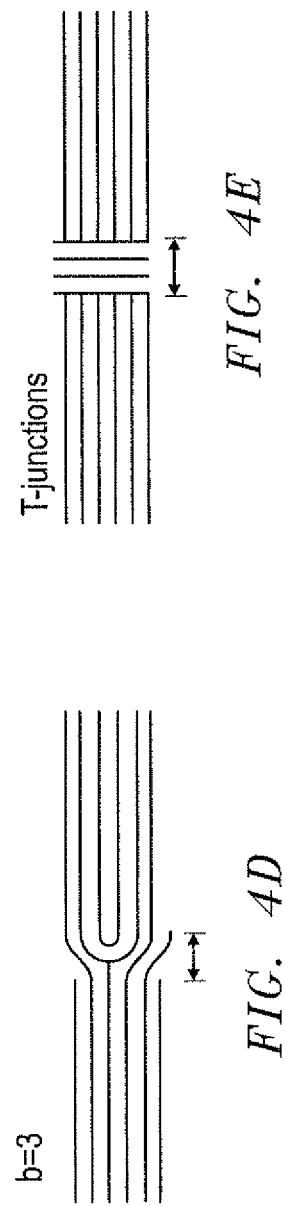

SYSTEM, METHOD AND APPARATUS FOR MASTER PATTERN GENERATION, INCLUDING SERVO PATTERNS, FOR ULTRA-HIGH DENSITY DISCRETE TRACK MEDIA USING E-BEAM AND SELF-ASSEMBLY OF BLOCK COPOLYMER MICRODOMAINS

BACKGROUND OF THE INVENTION

1. Technical Field

The present invention relates in general to the master patterns of discrete track media and, in particular, to the formation of a high quality discrete track media master pattern, including features to support servo patterns.

2. Description of the Related Art

Nanoimprinting has developed into a high profile technology that provides a pathway to the next generation of lithography and patterned media such as discrete track media (DTM). The features of nanoimprinting, such as pillars, pits, and tracks, are on the order of about 10 nm in diameter and/or width. The capability of transferring these nano-scaled features from a template, mold, or stamper to a substrate has been demonstrated. A master is typically used to generate the templates, and the templates are then used for mass imprinting production to avoid damage to the valuable master in any imprinting accident. Moreover, the potentials for nanoimprinting in high throughput and low manufacturing cost could trigger a paradigm shift in today's optical lithography technology.

As described herein, fabrication of discrete track media (DTM), like bit patterned media (BPM), may be accomplished by several techniques. For example, one fabrication method includes: (1) creating a master pattern on a master template, (2) high volume replication of the master pattern via UV cure nanoimprinting, and (3) etching transfer of the nanoimprinted pattern to the magnetic layer on disks. Although this technique is workable, an improved system, method and apparatus for forming high quality discrete track media master patterns, including features to support servo patterns for disk drive applications, would be desirable.

SUMMARY OF THE INVENTION

The invention comprises embodiments of a system, method, and apparatus for forming a high quality, master pattern for patterned media, such as discrete track media, including features to support servo patterns. The use of block copolymer self-assembly facilitates the formation of a track pattern with narrower tracks than can be achieved by e-beam lithography alone. The invention also produces a higher quality pattern than e-beam alone is capable of producing. Furthermore, other features are formed so that servo patterns are generated on the master disk in a manner that is consistent with block copolymer self-assembly.

E-beam lithography may be used to form a chemical contrast pattern of concentric rings, where the spacing of the rings is equal to an integral multiple of the target track pitch. The rings include regions within each servo sector header where the rings are offset radially by a fraction of a track pitch. Self-assembly is performed, which creates a new ring pattern at the target track pitch on top of the chemical contrast pattern, including the radial offsets in the servo sector headers, When this pattern is transferred to disks via nanoimprinting and etching, it creates tracks separated by nonmagnetic grooves, with the grooves and tracks including the radial offset regions.

In one embodiment, the formation of the pattern starts with a substrate having chemical contrast that provides different wetting affinities to the constituent materials of a block copolymer to direct the assembly of the block copolymer. One way to generate a substrate with such chemical contrast is by depositing a thin film on a substrate using a material that is either neutral or slightly preferential toward one of the microdomain types for the intended block copolymer self-assembly. E-beam resist is applied on top of the film, and exposed to create narrow grooves in the resist and developed. The sample is then subjected to an oxygen plasma or other means of altering the chemical properties of the brush film in the grooves where the film is not covered by resist. The e-beam resist is then removed with a suitable solvent. The result is a substrate with chemical contrast between the chemically modified brush areas and the unmodified areas.

After creation of the chemical contrast pattern, a block copolymer solution may be coated on top of the pattern and annealed. The block copolymer material is chosen so that it will form striped domains, and the spacing of the original e-beam contrast pattern is chosen to be near a small integer multiple of the natural periodicity of the annealed block copolymer. After annealing, the block copolymer forms stripes at its natural period which are generally parallel to and commensurate with the underlying contrast pattern. Since the contrast pattern includes the offset regions, the block copolymer lamellae will follow the shifts in the pattern.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

FIGS. 4A-E are enlarged schematic plan views of various alternate embodiments of servo sections for data tracks on magnetic media disks, and are constructed in accordance with the invention.

DETAILED DESCRIPTION OF THE INVENTION

Figure 1:
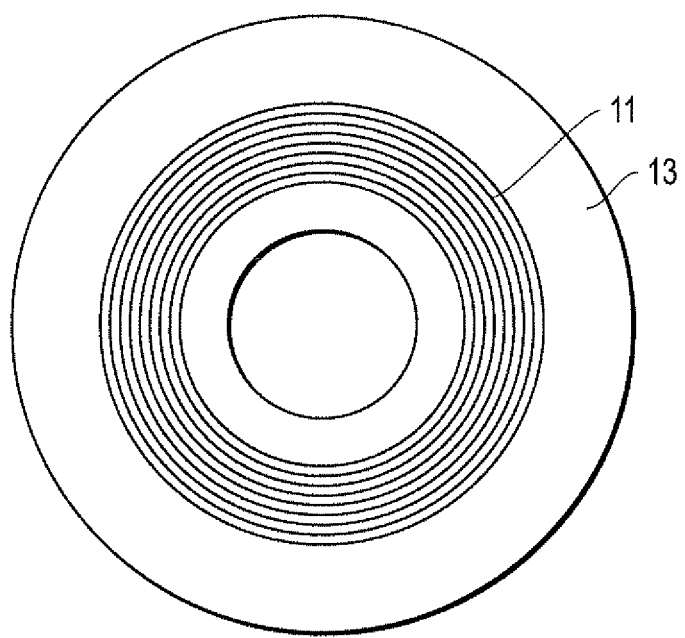
FIG. 1 is a schematic isometric view of one embodiment of a master template constructed in accordance with the invention.
Figure 2:
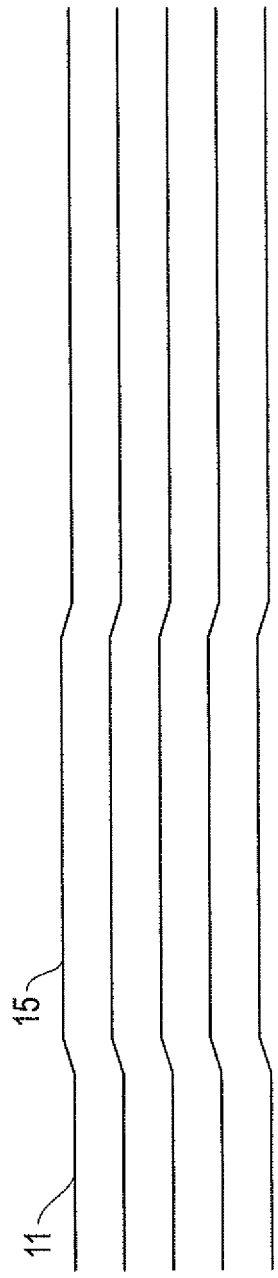
FIG. 2 is an enlarged schematic plan view of one embodiment of a series of data tracks on a magnetic media disk illustrating precursor lines, and is constructed in accordance with the invention.

Referring to FIGS. 1-4E, embodiments of a system, method and apparatus for forming a high quality, patterned media (e.g., discrete track media (DTM)) master pattern, disks and disk drives, including features to support servo patterns, are disclosed. The use of block copolymer self-assembly facilitates the formation of a DTM track pattern with narrower tracks (i.e., higher tracks per inch, or TPI) than can be achieved by e-beam lithography alone. This system also produces a higher quality pattern (i.e., in feature dimensional uniformity and placement tolerance) than e-beam alone is capable of producing. Furthermore, other features are formed so that servo patterns are generated on the master disk in a manner that is consistent with block copolymer self-assembly.

E-beam lithography may be used to form a chemical contrast pattern of substantially concentric rings 11 (FIG. 1) on a master template (e.g., a silicon or quartz wafer 13). The rings may be slightly eccentric or non-circular due to tolerances in patterning the tracks and in mounting the disk in the drive. The spacing of the rings is equal to an integral multiple of the target track pitch. The rings 11 include regions 15 (FIG. 2) within each servo sector header where the rings are offset radially by a fraction of a track pitch. Self-assembly is performed, which creates a new ring pattern at the target track pitch on top of the chemical contrast pattern, including the radial offsets in the servo sector headers. When this pattern is transferred to disks via nanoimprinting and etching, it creates tracks separated by nonmagnetic grooves, with the grooves and tracks including the radial offset regions.

The formation of the pattern starts with a substrate having chemical contrast that provides different wetting affinities to the constituent materials of a block copolymer to direct the assembly of the block copolymer One way to generate a substrate with such chemical contrast is by depositing a thin film on a substrate using a material that is either neutral or slightly preferential toward one of the microdomain types for the intended block copolymer self-assembly.

For example, this film can be a polymer brush film. E-beam resist is applied on top of the film, and exposed to create narrow (e.g., typically 30% of track pitch, with track pitch of 25-100 nm) grooves (i.e., clear areas) in the resist and developed. In other embodiments, a width of the open areas may range from about a same width as that formed by the block copolymer to about 50% of a ring spacing defined by the e-beam, with the target track pitch being in a range of about 25 to 100 mm. The open areas in the resist expose portions of the brush layer. The sample is then subjected to an oxygen plasma or other means of altering the chemical properties of the brush film (or even removing the brush film to expose the substrate) in the grooves where the film is not covered by resist. The e-beam resist is then removed with a suitable solvent. The result is a substrate with chemical contrast between the chemically modified (or removed) brush areas and the unmodified areas.

The patterns are concentric rings that represent the nonmagnetic grooves between tracks on the finished DTM disk. The rings, however, include short regions within what will become the servo sector headers where the radii of the rings are increased or decreased by a fraction of a track (e.g., ½ track is the simplest case). This means that the track pattern on the finished disk will include these radially-shifted regions within each intended servo sector header.

Although some embodiments expose the e-beam features that will correspond with the grooves on the finished disk, there are many process steps between the e-beam exposure and the final disk where the tone of the image can be reversed. Thus, the invention is not limited to exposing what will become nonmagnetic grooves on the finished disk. Moreover, the e-beam exposure creates rings at a multiple of the track pitch on the finished disk, so it does not expose all of the rings, whether track or groove, at this stage. In addition, the concentric rings defined by e-beam do not necessarily have to be continuous lines. The rings may be defined by, e.g., dotted lines, dashes, continuous lines, or combinations thereof.

After creation of the chemical contrast pattern, a block copolymer solution is coated on top of the pattern and annealed. The block copolymer material is chosen so that it will form striped domains (either a lamellar phase or cylindrical phase block copolymer would serve this purpose), and the spacing of the original e-beam contrast pattern is chosen to be near (e.g., within about 15% of) a small integer multiple (e.g., 1×, 2×, 3×, etc.) of the natural periodicity of the annealed block copolymer. In some embodiments, the polymeric material may comprise diblock copolymer, triblock copolymer, an n-block copolymer, and a blend of block copolymers and homopolymers. After annealing, the block copolymer forms periodic stripes at its natural period which are generally parallel to and commensurate (i.e., in registration) with the underlying contrast pattern. Since the contrast pattern includes the offset regions, the block copolymer lamellae will follow the shifts in the pattern.

Within a transition region at the beginning and end of the shifted region, it can be expected that the quality of the block copolymer stripe pattern may be poor or the stripes may even be somewhat disordered. Therefore the patterns are laid out in a manner where there is ample room for the bursts within the shifted region and outside of it, and the transition region can be ignored by the servo decoder. For example, as shown in FIG. 3, the A, B, C, and D bursts all have high quality (i.e., edges at the grooves are straight, and properly registered with the underlying chemical contrast pattern), which will support a precise head position determination.

Providing these offsets allows a servowriting operation to create a conventional quad burst pattern. In a quad burst pattern, there are typically four burst zones, A, B, C and D, as shown in FIG. 3. Note that the bursts A and B are written one-half track shifted relative to the data track, such that the groove which becomes the boundary (i.e., a circumferential curve separating A and B radially) is in the center of the data track. As the read head passes over this series of bursts, it is possible to determine the radial position of the read head with respect to the data track center (this is the conventional use of quad burst servo patterns).

Figure 3:
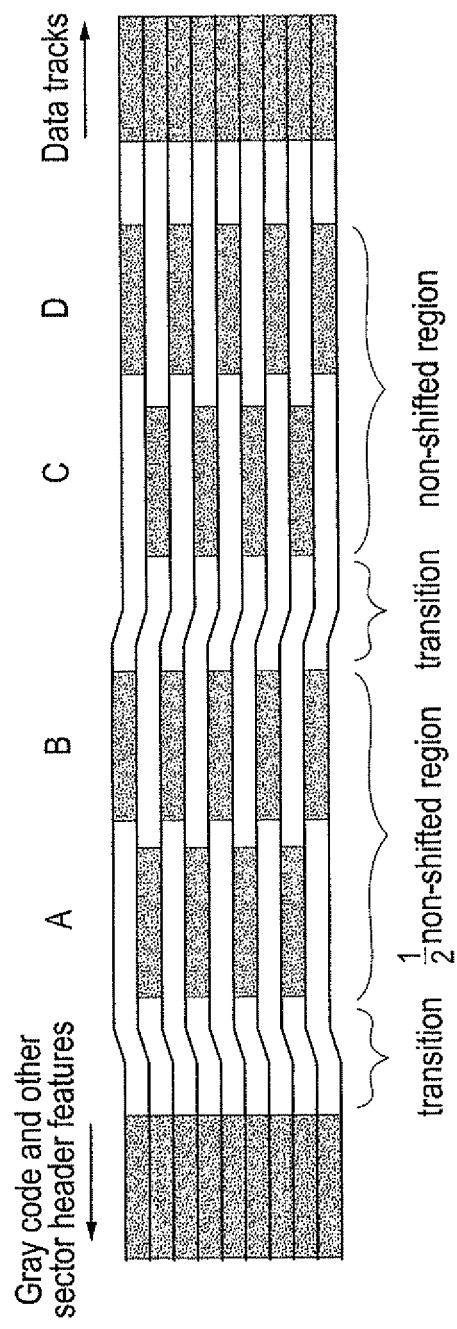
FIG. 3 is an enlarged schematic plan view of a servo section for data tracks on a magnetic media disk, and is constructed in accordance with the invention.

The patterns are magnetized in a self-servowrite operation, wherein the write head writes a burst (e.g., typically square wave) of alternating polarity magnetization in the regions A-D shown in FIG. 3. In the servo writing operation, the write head needs to be positioned over the tracks and follows the runout of the tracks. This can be accomplished using conventional procedures, such as the "Eclipse Locator" used by International Manufacturing & Engineering Services Co., Ltd. (IMES) in their RD2 spin stand system.

Although the quad burst pattern may be used, there are other more efficient servo patterns that also may be employed. Some of these also use a quadrature-type pattern where part of the pattern needs to be laterally shifted. This invention applies to any servo pattern that benefits from having a shifted region. Other embodiments include "null" patterns, which actually use two "null" regions arranged in quadrature like the AB-CD patterns of the quad burst approach.

There are several options to achieve a line shift by one-half track with a block copolymer striped pattern. Topologically, the line shift by a half-track pitch is the result of an edge dislocation with an odd Burgers vector b. There are multiple configurations for the transition region that would lead to the shift of the tracks. These configurations vary in the number of dislocations inserted in the transition region, their signs and the magnitude of their Burgers vectors. From energetic considerations, sets of dislocations of opposite signs may be more stable. The various configurations can provide stability for the pattern, control over the length of the transition area and mechanical rigidity to the pattern. The block copolymer stripes serve as a lithographic mask and hence mechanical rigidity is also important. The length of the transition region is controlled by the magnitude of the Burgers vector.

A few examples for the distribution of dislocations in the transition areas are shown in FIGS. 4A-E. Another option to induce the transition is through T-junctions as shown in FIG. 4E. In a T-junction, additional stripes can be inserted between the T's to control the length of the transition region (and, possibly, add code information). The transition region throughout the tracks could be composed of a combination of various configurations. In other embodiments, the edge dislocation is induced through one of: a line shift with b=1, a line shift with b=3, T-junctions and a random pattern.

Examples of line shifts by one-half track pitch by block copolymer patterns. FIGS. 4A-C illustrate examples of pairs of opposite dislocations of Burgers vector with a magnitude of one (1). The number of pairs and the distance between dislocation cores are varied. The transition length, however, is constant. FIG. 4D is an example of a line shift with b=3.

In some embodiments, the stripe-forming block copolymers tend to want to produce stripe patterns with proportions of about 50%. For DTM, embodiments with proportions of about 70% (e.g., land-to-groove ratio on finished disk) are desirable. Thus, the pattern may be biased to accomplish this by, e.g., modifying the block copolymer material, modifying the pattern in a subsequent processing step, etc. Subsequent modification options include adjusting etching conditions (e.g., overetching or use of less anisotropy in etching, which causes sideways as well as down etching), and deposition of material onto structure after etching. In some embodiments, conformal deposition of a thin film (e.g., by chemical vapor deposition) may be used to coat sidewalls of grooves as well as top and bottom. This technique tends to close up a groove, depending on how thick of a film is deposited. This technique may be used to readily convert a 50% structure into a 70% structure.

In servowriting, it is often necessary to move in fractional track steps. For example, to write the shifted quadrature part of the track as used in this invention, the write head is shifted by a half track. It is not desirable to shift suddenly during a single revolution, since this requires head motion that is faster than most mechanical actuators can provide. The shift may be displaced over two revolutions, one with the head shifted a half track to write the shifted regions, and another revolution to write the rest of the track. This can simply be generalized to writing servo patterns in multiple revolutions with fractional track shifts, since different kinds of servo patterns may be used that require a shift other than a half track. One option is to have two shifted regions, one shifted by ⅓ track, and the second by ⅔ track.

While the invention has been shown or described in only some of its forms, it should be apparent to those skilled in the art that it is not so limited, but is susceptible to various changes without departing from the scope of the invention. For example, the invention may be employed to fabricate master templates, replicated working templates, as well as finished disks for disk drives, In addition, during the overall fabrication process, the desired pattern may be transferred from annealed block copolymer films to another surface or film since it is necessary to develop the pattern. This may comprise selectively removing one of the two phases of the block copolymer either with a wet etchant or a dry reactive ion etch. This is analogous to developing photoresist, where the exposed portion is selectively removed by the developer. Moreover, modification of the thin film to make the chemical contrast pattern may be performed in several ways (e.g., exposure of the film to an oxygen plasma through openings in developed e-beam resist). In alternate embodiments, simple direct e-beam exposure of the thin film may be used, which modifies it without need for further processing, or exposure to other kinds of plasmas, notably fluorine.

What is claimed is:

1. A method of forming a patterned media master pattern and magnetic media disks, comprising:
    (a) using e-beam lithography to form a chemical contrast pattern of concentric rings on a disk, where a spacing of the concentric rings is equal to an integral multiple of a target track pitch, the rings including regions within servo sector headers where the rings are continuous and offset radially by a fraction of a track pitch, including providing a substrate with chemical contrast that provides different wetting affinities to constituent materials of a block copolymer to direct assembly of the block copolymer, and the patterned media comprises discrete track media;
    (b) forming the chemical contrast pattern by depositing a polymer brush film on the substrate, applying e-beam resist on the polymer brush film to form and develop open areas in the e-beam resist, such that the open areas in the e-beam resist expose portions of the polymer brush film, chemical properties of the polymer brush film are altered in the open areas where the polymer brush film is not covered by e-beam resist, and removing the e-beam resist to form the substrate with chemical contrast pattern between the chemically modified polymer brush areas and unmodified areas;
    (c) performing self-assembly to form a new ring pattern at the target track pitch on top of the chemical contrast pattern, including the radial offsets in the servo sector headers; and
    (d) transferring the new ring pattern to magnetic media disks to form data tracks on the magnetic media disks that are separated by nonmagnetic grooves, with the nonmagnetic grooves and the data tracks including radial offset regions.

2. A method according to claim 1, wherein a width of the open areas may range from about a same width as that formed by the block copolymer to about 50% of a ring spacing defined by the e-beam, with the target track pitch being in a range of about 25 to 100 nm.

3. A method according to claim 1, wherein the polymer brush film is subjected to an oxygen plasma to remove the polymer brush film from the nonmagnetic grooves to expose the substrate.

4. A method according to claim 1, wherein the fraction of the track pitch is one-half track.

5. A method according to claim 1, wherein step (b) comprises coating a block copolymer solution on the chemical contrast pattern and performing an annealing step, and the polymeric material may comprise diblock copolymer, triblock copolymer, an n-block copolymer, and a blend of block copolymers and homopolymers.

6. A method according to claim 5, wherein the block copolymer is chosen to form striped domains, and a spacing of the e-beam contrast pattern is chosen to be a small integer multiple of a natural periodicity of the annealed block copolymer.

7. A method according to claim 6, wherein the striped domains comprise either a lamellar phase or a cylindrical phase block copolymer.

8. A method according to claim 5, wherein after annealing, the block copolymer forms periodic stripes generally parallel to and in registration with the underlying chemical contrast pattern and, since the chemical contrast pattern includes the offset regions, the block copolymer lamellae follow shifts in the chemical contrast pattern.

9. A method according to claim 1, wherein the servo sector headers include transition regions at a beginning and an end thereof, and the chemical contrast patterns are formed to provide space for bursts within the servo sector headers and outside of the servo sector headers, such that the transition regions may be ignored by servo decoders.

10. A method according to claim 9, wherein the bursts comprise A, B, C, and D bursts with straight, high quality edges at the nonmagnetic grooves, and registered with the underlying chemical contrast pattern, to support a precise read head position determination.

11. A method according to claim 1, wherein the fraction of the track pitch with a block copolymer striped pattern via an edge dislocation with an odd Burgers vector b.

12. A method according to claim 11, wherein the edge dislocation is induced through one of: a line shift with b=1, a line shift with b=3, T-junctions and a random pattern.

13. A method of forming a master pattern and workpieces, comprising:
(a) using e-beam lithography to form a chemical contrast pattern of concentric rings, where a spacing of the concentric rings is equal to an integral multiple of a target pitch, the rings including regions where the rings are continuous and offset radially by a fraction of a pitch, the fraction of the pitch results from an edge dislocation with an odd Burgers vector b, providing a substrate with chemical contrast that provides different wetting affinities to constituent materials of a block copolymer to direct assembly of the block copolymer;
(b) performing self-assembly to form a new ring pattern at the target pitch on top of the chemical contrast pattern, including the radial offsets;
(c) transferring the new ring pattern to workpieces to form formations on the workpieces that are separated by grooves, with the grooves and the formations including radial offset regions; wherein
the chemical contrast is formed by depositing a thin film on the substrate using a material that is either neutral or slightly preferential toward at least one of a plurality of microdomain types for an intended block copolymer self-assembly; and
the thin film is a polymer brush film, and e-beam resist is applied on top of the polymer brush film and exposed to create open areas in the resist and developed, such that the open areas in the e-beam resist expose portions of the polymer brush film.

14. A method according to claim 13, wherein a width of the open areas may range from about a same width as that formed by the block copolymer to about 50% of a ring spacing defined by the e-beam, with the target pitch being in a range of about 25 to 100 nm; and
chemical properties of the polymer brush film are altered in open areas where the polymer brush film is not covered by e-beam resist, then removing the e-beam resist with a suitable solvent to form the substrate with chemical contrast between chemically modified polymer brush areas and unmodified areas.

15. A method according to claim 14, wherein the polymer brush film is subjected to an oxygen plasma to remove the polymer brush film from the nonmagnetic grooves to expose the substrate.

16. A method according to claim 13, wherein step (b) comprises coating a block copolymer solution on the chemical contrast pattern and performing an annealing step, and the polymeric material may comprise diblock copolymer, triblock copolymer, an n-block copolymer, and a blend of block copolymers and homopolymers; and
the block copolymer is chosen to form striped domains, and a spacing of the e-beam contrast pattern is chosen to be a small integer multiple of a natural periodicity of the annealed block copolymer.

17. A method according to claim 16, wherein the striped domains comprise either a lamellar phase or a cylindrical phase block copolymer.

18. A method according to claim 16, wherein after annealing, the block copolymer forms periodic stripes generally parallel to and in registration with the underlying chemical contrast pattern and, since the chemical contrast pattern includes the offset regions, the block copolymer lamellae follow shifts in the chemical contrast pattern.

19. A method according to claim 13, wherein the edge dislocation is induced through one of: a line shift with b=1, a line shift with b=3, T-junctions and a random pattern.

\* \* \* \* \*